(12) United States Patent
Rosebaugh et al.

(10) Patent No.: US 12,109,622 B1
(45) Date of Patent: Oct. 8, 2024

(54) SPINDLES PEENING OFFSET FIXTURE FOR CNC TURNING

(71) Applicant: Raytheon Technologies Corporation, Farmington, CT (US)

(72) Inventors: Jeffrey L. Rosebaugh, Topeka, KS (US); Stephen Kapp, Columbus, GA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/121,157

(22) Filed: Mar. 14, 2023

(51) Int. Cl.
*B23B 25/00* (2006.01)
*B23Q 3/06* (2006.01)

(52) U.S. Cl.
CPC .............. *B23B 25/00* (2013.01); *B23Q 3/063* (2013.01)

(58) Field of Classification Search
CPC ................................ B23B 25/00; B23Q 3/063
See application file for complete search history.

(56) References Cited

U.S. PATENT DOCUMENTS

| | | | |
|---|---|---|---|
| 3,827,965 A | 8/1974 | Andrews | |
| 6,017,263 A * | 1/2000 | Dwyer | B23Q 3/063 |
| | | | 451/28 |
| 6,186,867 B1 * | 2/2001 | Dwyer | B24B 41/06 |
| | | | 451/28 |
| 9,441,493 B2 * | 9/2016 | Simmons | B23Q 3/063 |
| 9,586,301 B2 | 3/2017 | Marquoin et al. | |
| 10,220,461 B2 * | 3/2019 | Hoskin | B23H 9/14 |
| 10,589,392 B2 | 3/2020 | Durrant et al. | |
| 10,774,683 B2 * | 9/2020 | Hoskin | B23Q 3/063 |
| 2010/0288052 A1 * | 11/2010 | Tanaka | G01M 15/14 |
| | | | 73/660 |
| 2013/0318773 A1 * | 12/2013 | Moss | B23Q 3/06 |
| | | | 269/80 |
| 2018/0297136 A1 | 10/2018 | Hoskin et al. | |

FOREIGN PATENT DOCUMENTS

| | | | | |
|---|---|---|---|---|
| CN | 107838642 B | | 3/2019 | |
| DE | 10026829 A1 * | 12/2001 | | B23Q 3/063 |
| DE | 102014101628 A1 | | 8/2015 | |
| EP | 3015218 A1 | | 5/2016 | |
| WO | 2016163408 A1 | | 10/2016 | |

OTHER PUBLICATIONS

Extended European Search Report for corresponding EP Application No. 24162680.3 dated Jul. 22, 2024.

* cited by examiner

*Primary Examiner* — Jacob J Cigna
(74) *Attorney, Agent, or Firm* — Bachman & LaPointe, P.C.

(57) ABSTRACT

A turning fixture including a fixture insert attached to the turning fixture, the fixture insert comprising an upper portion having an upper portion body, the upper portion body includes a central span with a first arm and second arm opposite the first arm, a cavity is defined between the first arm and the second arm along the central span on an inner side of the upper portion body; the fixture insert including a lower portion having a lower portion body that includes a chamber located centrally between a first end and a second end; and a rod is insertable through the lower portion through the chamber, the rod being configured to apply a force to a compressor spindle vane inserted between the upper portion and the lower portion.

20 Claims, 5 Drawing Sheets

SPINDLES PEENING OFFSET FIXTURE FOR CNC TURNING

BACKGROUND

The present disclosure is directed to the relative positions of spindle/trunnion surfaces on spindle vanes after post processing operations. Particularly a fixture is configured to account for the offset on spindles caused by stress relief and peening processing.

The general process flow for milling a compressor spindle vane includes operations that are the primary drivers for the dimensional requirements of the spindles, buttons, and the airfoil. For a mill process, an oversized forging is loaded into a mill turn CNC to turn the spindles. Then a 5-axis CNC is employed to mill the airfoil. From there, the part goes through a variety of finishing operations. Most of the finishing operations have a negligible effect on the dimensional requirements except for airfoil peening. Airfoil peening has been shown to significantly change the overall shape of the part via bowing. After all finishing operations are done, the part is inspected for airfoil and spindle dimensions.

The problem to be solved includes the relative positions of spindle/trunnion surfaces on spindle vanes after post processing operations. The relative position of the ID spindle to the OD spindle shifts through finishing operations such as airfoil peening and is the main driver for cost of poor quality on spindle vanes.

Historically, the problem was thought to be the airfoil peening operation, thus the engineering focus to solve the problem has been on the peening process. Through the heightened focus on the peening operation, peening has become highly controlled and repeatable while also minimizing the amount of distortion caused by peening.

However, peening will always cause some distortion to an extent, and the process is now thought to have distortion minimized as best possible for production. The peening distortion amount is still causing the majority of dimensional nonconformances for spindle vanes. The focus has shifted to the CNC turning operation to find ways to offset for peening distortions.

As seen by the contrast of FIG. 1 showing the spindles S being aligned on the same axis and FIG. 2 showing the spindles S being distorted relative to each other and being nonconforming. The relative position of the inner diameter (ID) spindle to the outer diameter (OD) spindle moves through post turning operations such as stress relief and airfoil peening. It is anticipated that spindle tolerances will become more restrictive in the future. It is known that airfoil peening will be required on compressor airfoils, and airfoil peening will distort an airfoil to at least some degree.

The solution is to find a way to offset a part at the turning operation to account for peening distortion.

SUMMARY

In accordance with the present disclosure, there is provided a turning fixture comprising a fixture insert attached to the turning fixture, the fixture insert comprising an upper portion having an upper portion body, the upper portion body includes a central span with a first arm and second arm opposite the first arm, a cavity is defined between the first arm and the second arm along the central span on an inner side of the upper portion body; the fixture insert including a lower portion having a lower portion body that includes a chamber located centrally between a first end and a second end; and a rod is insertable through the lower portion through the chamber, the rod being configured to apply a force to a compressor spindle vane inserted between the upper portion and the lower portion.

A further embodiment of any of the foregoing embodiments may additionally and/or alternatively include the cavity is sized to allow for an airfoil of the compressor spindle vane to deflect without impinging on the inner side.

A further embodiment of any of the foregoing embodiments may additionally and/or alternatively include the lower portion body is configured to contact the airfoil opposite the first arm and the second arm of the upper portion.

A further embodiment of any of the foregoing embodiments may additionally and/or alternatively include the lower portion body is configured to contact the airfoil along a length of the airfoil minus a chamber width.

A further embodiment of any of the foregoing embodiments may additionally and/or alternatively include the rod is configured to translate through the chamber for impingement on the airfoil and to apply the force that deflects the airfoil toward the cavity.

A further embodiment of any of the foregoing embodiments may additionally and/or alternatively include the upper portion is configured to press against the airfoil with both the first arm and the second arm proximate filets of each of the spindles.

A further embodiment of any of the foregoing embodiments may additionally and/or alternatively include the rod is configured to press against the airfoil on an opposite side of the airfoil from the first arm and the second arm.

In accordance with the present disclosure, there is provided a turning fixture for machining a compressor spindle vane comprising a fixture insert attached to the turning fixture, the fixture insert comprising an upper portion having an upper portion body, the upper portion body includes a central span with a first arm and second arm opposite the first arm, a cavity is defined between the first arm and the second arm along the central span on an inner side of the upper portion body; the fixture insert including a lower portion having a lower portion body that includes a chamber located centrally between a first end and a second end; and a rod is insertable through the lower portion through the chamber, the rod being configured to apply a force to an airfoil of the compressor spindle vane inserted between the upper portion and the lower portion.

A further embodiment of any of the foregoing embodiments may additionally and/or alternatively include the cavity is sized for deflection of the airfoil of the compressor spindle vane in the absence of impingement on the inner side.

A further embodiment of any of the foregoing embodiments may additionally and/or alternatively include the lower portion body is configured to contact the airfoil opposite the first arm and the second arm of the upper portion.

A further embodiment of any of the foregoing embodiments may additionally and/or alternatively include the rod is configured to translate through the chamber for impingement on the airfoil and to apply the force that deflects the airfoil toward the cavity.

A further embodiment of any of the foregoing embodiments may additionally and/or alternatively include the force applied by the rod is configured to distort the compressor spindle vane in an equal and opposite amount of a predetermined distortion defined by a subsequent finishing operation.

A further embodiment of any of the foregoing embodiments may additionally and/or alternatively include the fixture insert is interchangeable in the turning fixture and configured to be replaced by another fixture insert configured for a particular design.

In accordance with the present disclosure, there is provided a process for distorting a compressor spindle vane mounted in a turning fixture comprising inserting the compressor spindle vane into a fixture insert attached the turning fixture between an upper portion and a lower portion; forcing a rod against an airfoil of the compressor spindle vane toward a cavity formed in the upper portion; and creating an offset in the compressor spindle vane.

A further embodiment of any of the foregoing embodiments may additionally and/or alternatively include the upper portion body includes a central span with a first arm and a second arm opposite the first arm; the cavity being defined between the first arm and the second arm along the central span on an inner side of the upper portion body proximate to the compressor spindle vane.

A further embodiment of any of the foregoing embodiments may additionally and/or alternatively include the lower portion includes a lower portion body that includes a chamber located centrally between a first end and a second end; and the rod is insertable through the lower portion through the chamber.

A further embodiment of any of the foregoing embodiments may additionally and/or alternatively include the compressor spindle vane offset is in an equal and opposite amount of a predetermined distortion defined by subsequent finishing operation.

A further embodiment of any of the foregoing embodiments may additionally and/or alternatively include the offset is a distortion defined by an angle of deflection from a central axis of the compressor spindle vane.

A further embodiment of any of the foregoing embodiments may additionally and/or alternatively include the process further comprising at least one of: removing the fixture insert from the turning fixture; and inserting the fixture insert in the turning fixture; and replacing the fixture insert with another fixture insert configured for a particular design.

A further embodiment of any of the foregoing embodiments may additionally and/or alternatively include the process further comprising controlling an amount of angle offset on spindles of the compressor spindle vane in the fixture with a zero out dial indicator.

The disclosed process can offset for the distortion that happens through post processing and still use the capability of turning both spindles on the same axis in a CNC lathe.

The intent of the disclosed process is to focus on spindle turn, airfoil peen, and spindle inspection. The goal is to have conforming spindles at spindle inspection. The current process attempts to minimize distortion caused during peening, however, minimizing the distortion is not adequate. Whereas the disclosed process accounts for distortion at spindle turn by offsetting the spindles, so the inherent and controlled distortion caused by peening will 'correct' the spindles thus yielding a conforming part.

Other details of the disclosed process and fixture are set forth in the following detailed description and the accompanying drawings wherein like reference numerals depict like elements.

DETAILED DESCRIPTION

Figure 1:
FIG. 1 is a schematic representation of an exemplary conforming spindle.
Figure 2:
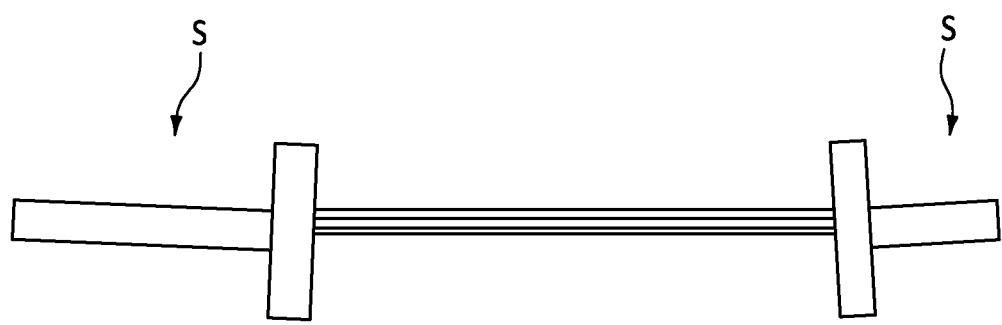
FIG. 2 is a schematic representation of an exemplary nonconforming spindle.
Figure 3:
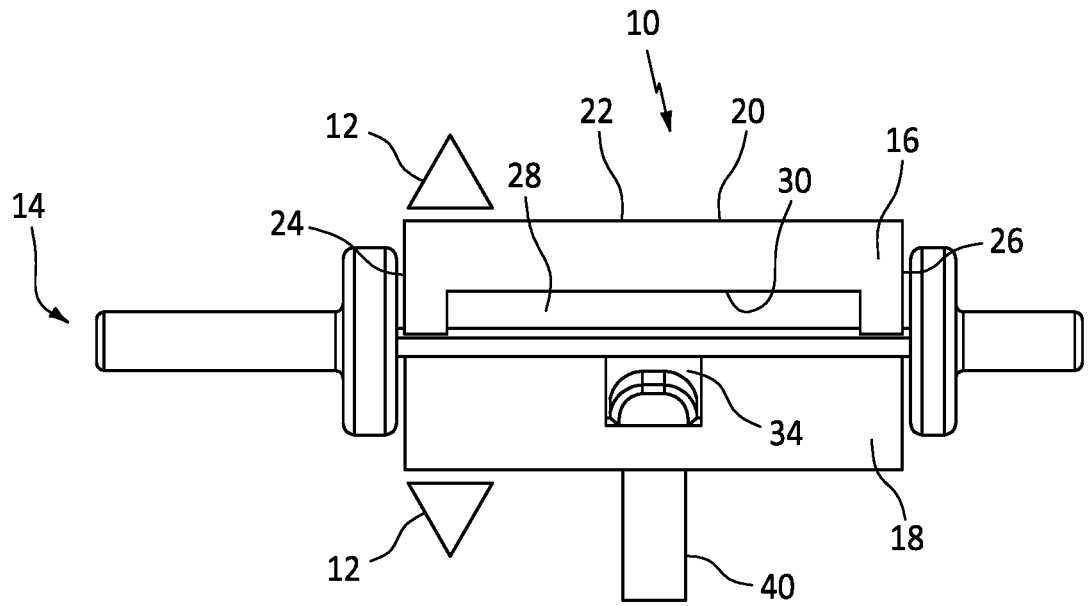
FIG. 3 is a front view schematic representation of an exemplary fixture.
Figure 4:
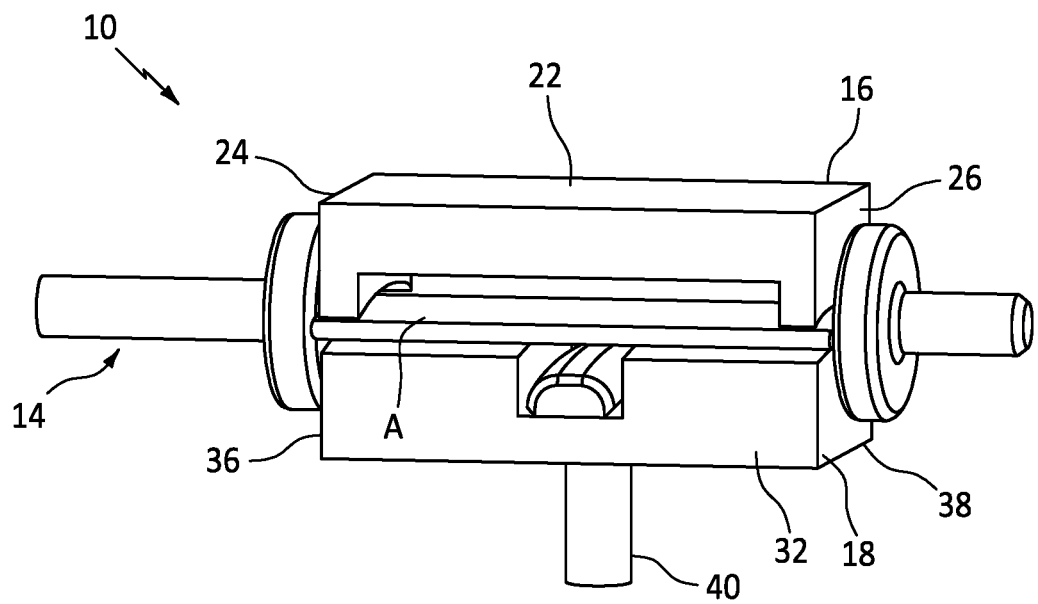
FIG. 4 is an isometric view schematic representation of the exemplary fixture.
Figure 5:
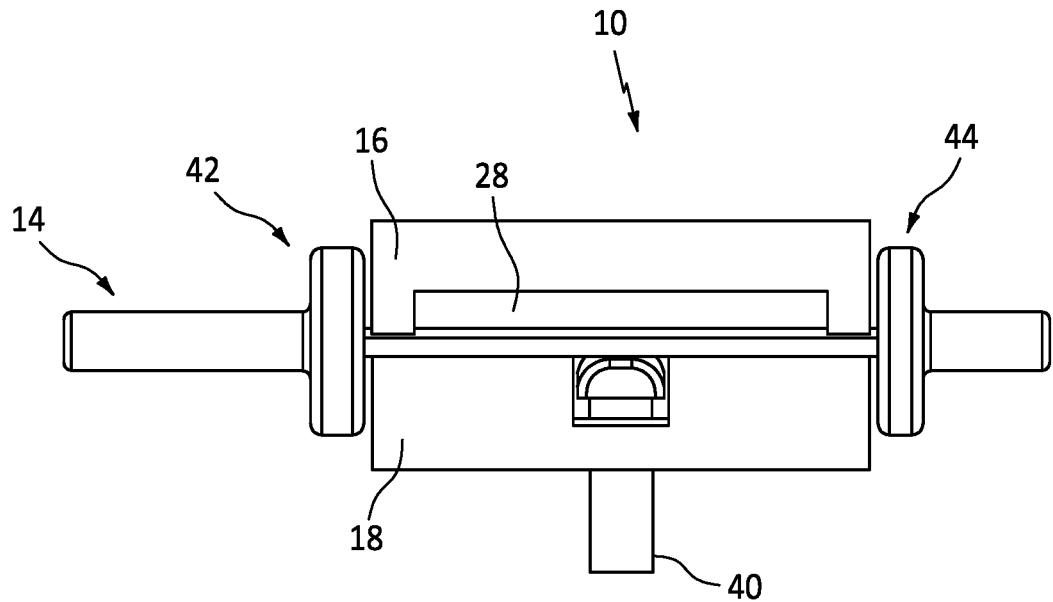
FIG. 5 is a front view schematic of the exemplary fixture engaging a part.
Figure 6:
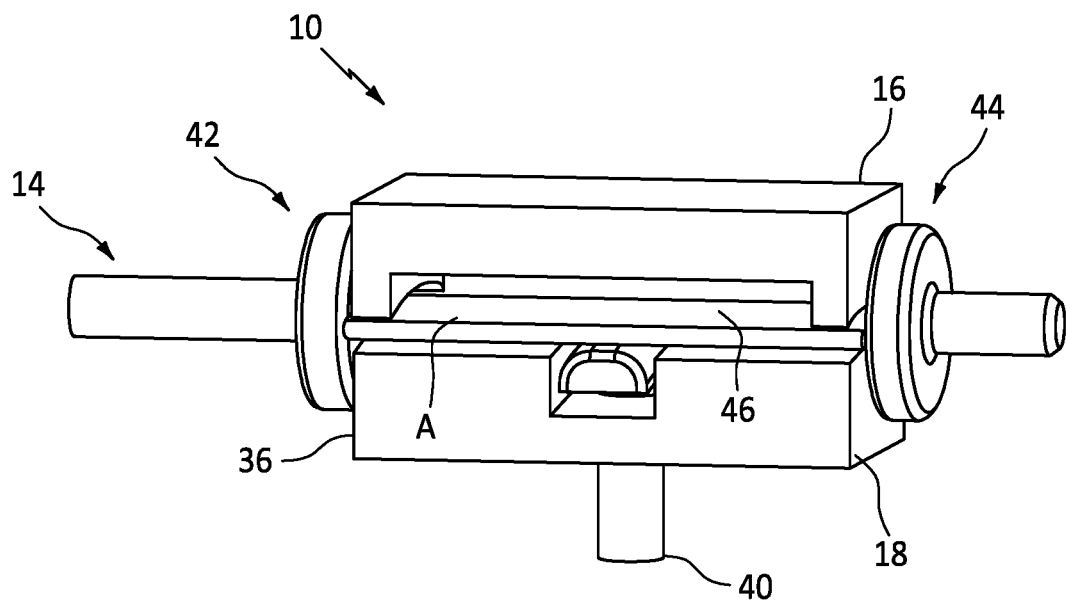
FIG. 6 is an isometric view schematic of the exemplary fixture engaging a part.

Referring to FIG. 3 and FIG. 4, there is illustrated exemplary fixture insert 10. The fixture insert 10 are configured to go into a standard turning fixture 12 (shown schematically). The fixture insert 10 are configured to support a compressor spindle vane 14. The fixture insert 10 can be utilized to support the compressor spindle vane 14 during a spindle turn operation. The fixture insert 10 includes an upper portion 16 and a lower portion 18.

The upper portion 16 includes an upper portion body 20. The upper portion body 20 includes a central span 22 with a first arm 24 and second arm 26 opposite the first arm 24. A cavity 28 is defined between the first arm 24 and second arm 26 along the central span 22 on an inner side 30 of the upper portion body 20 proximate to the compressor spindle vane 14. The cavity 28 is sized to allow sufficient space for the airfoil A of the compressor spindle vane 14 to deflect without impinging on the inner side 30.

The lower portion 18 includes a lower portion body 32. The lower portion body 32 includes a chamber 34 located centrally between a first end 36 and a second end 38. The lower portion body 32 contacts the airfoil A opposite the first arm 24 and the second arm 26 of the upper portion 16, as well as along the length of the airfoil A. The chamber 34 does not contact the airfoil A along the width of the chamber 34. The chamber 34 receives a rod 40 that translates through the chamber 34 for impingement on the airfoil A.

Referring also to FIG. 5, FIG. 6, FIG. 7, and FIG. 8, showing more details of the fixture inserts 10. The rod 40 is configured to press against the airfoil A and apply a deflection force that deflects the airfoil A toward the cavity 28.

The upper portion 16 is configured to press against the airfoil A with each of the first arm 24 and the second arm 26 proximate each of filets of the spindles 42 44. The rod 40 is configured to press against the airfoil A at approximately a central portion 46 of the airfoil A. The rod 40 is configured to press against the airfoil on an opposite side of the airfoil A from the arms 24, 26.

Figure 7:
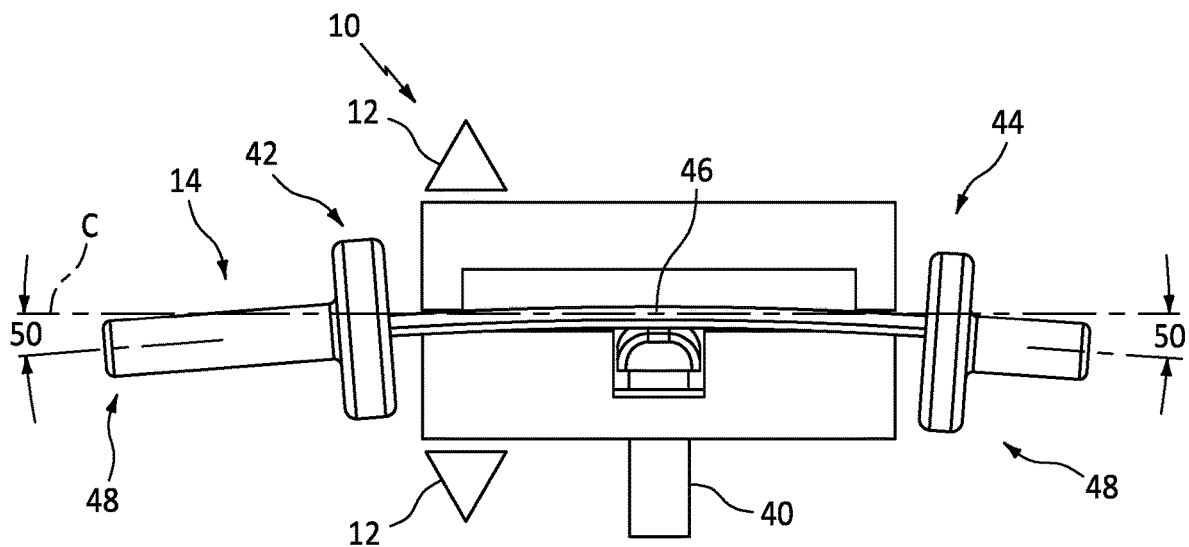
FIG. 7 is a front view schematic of the exemplary fixture engaged on a part with shape change.
Figure 8:
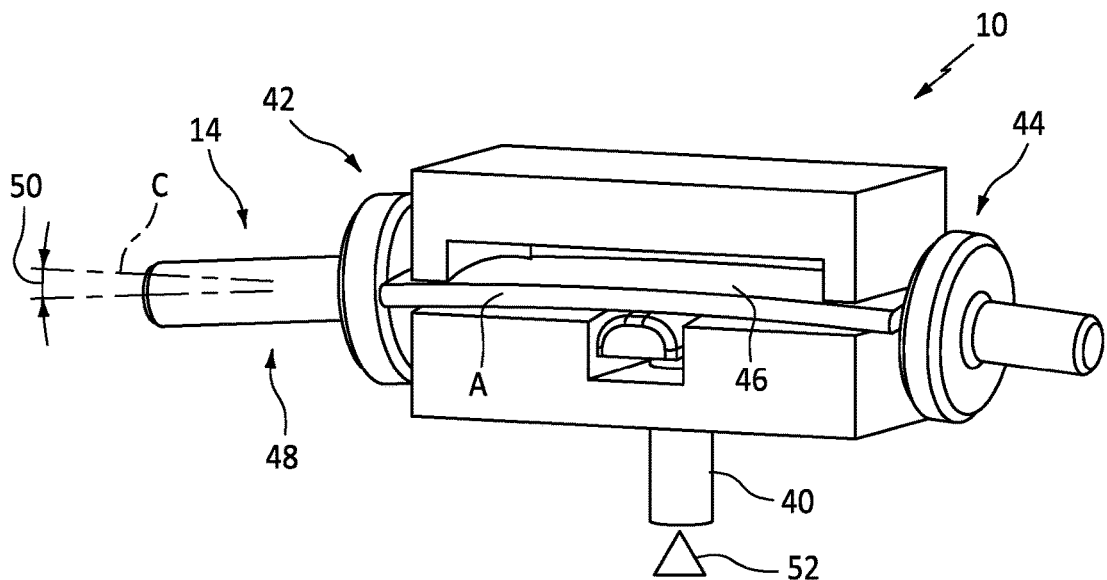
FIG. 8 is a front view schematic of the exemplary fixture engaged on a part with shape change.

As seen in FIG. 7 and FIG. 8, the schematic representation of the translation of the rod 40 pressing against the airfoil A at a central portion 46 distorts the compressor spindle vane part 14 to create an offset 48 from a central axis C. The offset 48 can be defined by an angle of deflection 50. The offset 48 is configured to match the anticipated distortion that will be created by the peening processing.

The turning fixture 12 with fixture inserts 10 and rod 40 apply sufficient force on the pre-machined airfoil A during the turning operation to distort the compressor spindle vane part 14 in an equal and opposite amount of the distortion that the subsequent peening operation will have on the compressor spindle vane part 14. The fixture insert 10 is insertable and can be customized for particular compressor spindle vane parts 14, such that the fixture insert 10 can be swapped out for another fixture insert 10 for particular designs during changeover. The fixture insert 10 can be matched to particular part 14 design to achieve the required offset on the spindles 42, 44. A dial indicator (not shown) can be used to obtain the predetermined offset on the part 14 during the turning process. The amount of angle offset 48 on the spindles 42, 44 while loading in the fixture 12 can be controlled with the zero out dial indicator. The fixture inserts 10 can be designed for applying the pressure to points along the airfoil A in order to achieve the required offsets on the spindles 42, 44.

In an exemplary embodiment, the fixture 12 with fixture insert 10 can be targeted for manufacturing target dimensions for the spindles 14 which should allow for conforming to blueprint dimensions at a final spindle inspection.

An actuator 52 is in operative communication with the rod 40. The actuator 52 is configured to move the rod 40 for the application of the forces to deflect the airfoil A.

Figure 9:
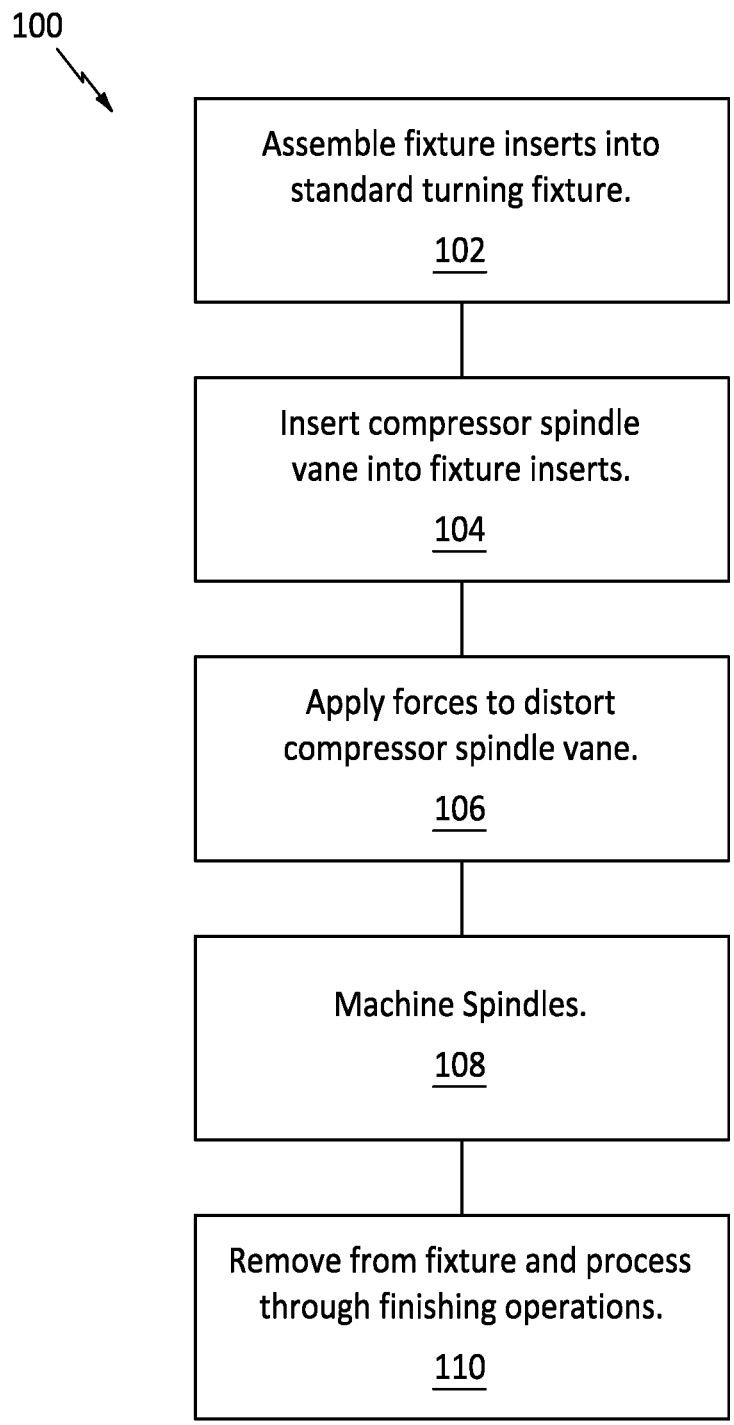
FIG. 9 is a process map of the exemplary process.

Referring to FIG. 9 a process map is shown. The process 100. The process 100 includes a step 102 of assembling the fixture insert into the standard turning fixture. The step 104 includes inserting the compressor spindle vane into the fixture insert. The step 106 includes applying forces to distort the compressor spindle vane. The step 108 includes machining the spindles. The step 110 includes removing the compressor spindle from the fixture and process through finishing operations.

A technical advantage of the disclosed fixturing process and fixture includes producing an offset on a part at the turning operation to account for peening distortion to give manufacturing better process control and capability.

Another technical advantage of the disclosed fixturing process and fixture includes the capacity to change the fixture along with a new control plan to allow for manufacturing operations to target for a predetermined amount of offset by applying more or less force to the compressor spindle vane, and while avoiding capitol expense for downstream processing.

Another technical advantage of the disclosed fixturing process and fixture includes the capacity to have greater process control and capability because manufacturing process can turn the part with distortion added to account for the inherent distortion caused by finishing operations.

Another technical advantage of the disclosed fixturing process and fixture includes the capacity to design a process that accounts for the known finishing distortions.

Another technical advantage of the disclosed fixturing process and fixture includes a fixture that enables control over the process at the machining level instead of reacting to a widely known condition after the part is over 90% complete.

Another technical advantage of the disclosed fixturing process and fixture includes a fixturing process that allows one to fix the spindle relative position issue during manufacturing of the compressor spindle vane to reduce cost of poor quality, improve engine performance and limit wear issues in the field.

There has been provided a process and fixture. While the process and fixture have been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:
1. A turning fixture comprising:
a fixture insert attached to the turning fixture, the fixture insert comprising an upper portion having an upper portion body, the upper portion body includes a central span with a first arm and second arm opposite the first arm, a cavity is defined between the first arm and the second arm along the central span on an inner side of the upper portion body; the fixture insert including a lower portion having a lower portion body that includes a chamber located centrally between a first end and a second end; and
a rod is insertable through the lower portion through the chamber, the rod being configured to apply a force to a compressor spindle vane inserted between the upper portion and the lower portion.
2. The turning fixture according to claim 1, wherein the cavity is sized to allow for an airfoil of the compressor spindle vane to deflect without impinging on the inner side.
3. The turning fixture according to claim 1, wherein the lower portion body is configured to contact the airfoil opposite the first arm and the second arm of the upper portion.
4. The turning fixture according to claim 1, wherein the lower portion body is configured to contact the airfoil along a length of the airfoil minus a chamber width.
5. The turning fixture according to claim 1, wherein the rod is configured to translate through the chamber for impingement on the airfoil and to apply the force that deflects the airfoil toward the cavity.
6. The turning fixture according to claim 1, wherein the upper portion is configured to press against the airfoil with both the first arm and the second arm proximate filets of each of the spindles.
7. The turning fixture according to claim 1, wherein the rod is configured to press against the airfoil on an opposite side of the airfoil from the first arm and the second arm.
8. A turning fixture for machining a compressor spindle vane comprising:
a fixture insert attached to the turning fixture, the fixture insert comprising an upper portion having an upper portion body, the upper portion body includes a central span with a first arm and second arm opposite the first arm, a cavity is defined between the first arm and the second arm along the central span on an inner side of the upper portion body; the fixture insert including a lower portion having a lower portion body that includes a chamber located centrally between a first end and a second end; and
a rod is insertable through the lower portion through the chamber, the rod being configured to apply a force to an airfoil of the compressor spindle vane inserted between the upper portion and the lower portion.
9. The turning fixture for machining a compressor spindle vane according to claim 8, wherein the cavity is sized for deflection of the airfoil of the compressor spindle vane in the absence of impingement on the inner side.
10. The turning fixture for machining a compressor spindle vane according to claim 8, wherein the lower portion body is configured to contact the airfoil opposite the first arm and the second arm of the upper portion.
11. The turning fixture for machining a compressor spindle vane according to claim 8, wherein the rod is configured to translate through the chamber for impingement on the airfoil and to apply the force that deflects the airfoil toward the cavity.

12. The turning fixture for machining a compressor spindle vane according to claim 8, wherein the force applied by the rod is configured to distort the compressor spindle vane in an equal and opposite amount of a predetermined distortion defined by a subsequent finishing operation.

13. The turning fixture for machining a compressor spindle vane according to claim 8, wherein the fixture insert is interchangeable in the turning fixture and configured to be replaced by another fixture insert configured for a particular design.

14. A process for distorting a compressor spindle vane mounted in a turning fixture comprising:

inserting the compressor spindle vane into a fixture insert attached the turning fixture between an upper portion and a lower portion;

forcing a rod against an airfoil of the compressor spindle vane toward a cavity formed in the upper portion; and creating an offset in the compressor spindle vane.

15. The process of claim 14, wherein the upper portion body includes a central span with a first arm and a second arm opposite the first arm; the cavity being defined between the first arm and the second arm along the central span on an inner side of the upper portion body proximate to the compressor spindle vane.

16. The process of claim 14, wherein the lower portion includes a lower portion body that includes a chamber located centrally between a first end and a second end; and the rod is insertable through the lower portion through the chamber.

17. The process of claim 14, wherein the compressor spindle vane offset is in an equal and opposite amount of a predetermined distortion defined by subsequent finishing operation.

18. The process of claim 14, wherein the offset is a distortion defined by an angle of deflection from a central axis of the compressor spindle vane.

19. The process of claim 14, further comprising:

at least one of:

removing the fixture insert from the turning fixture; and inserting the fixture insert in the turning fixture; and replacing the fixture insert with another fixture insert configured for a particular design.

20. The process of claim 14, further comprising:

controlling an amount of angle offset on spindles of the compressor spindle vane in the fixture with a zero out dial indicator.

* * * * *